Figure 3:
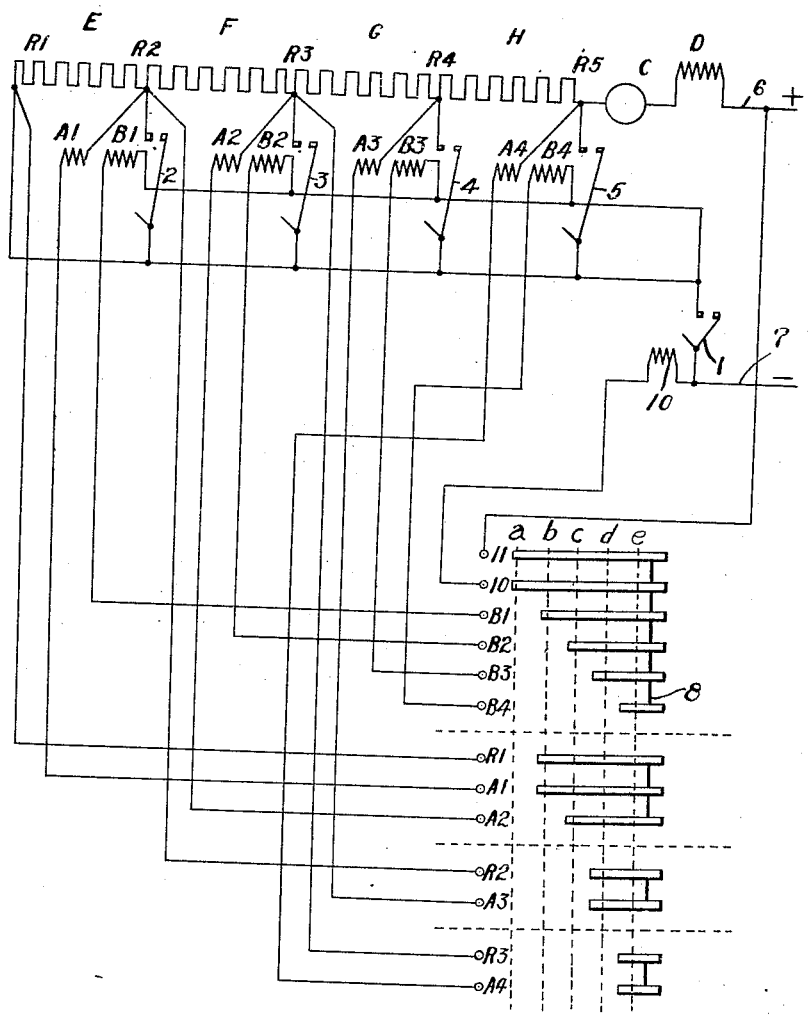

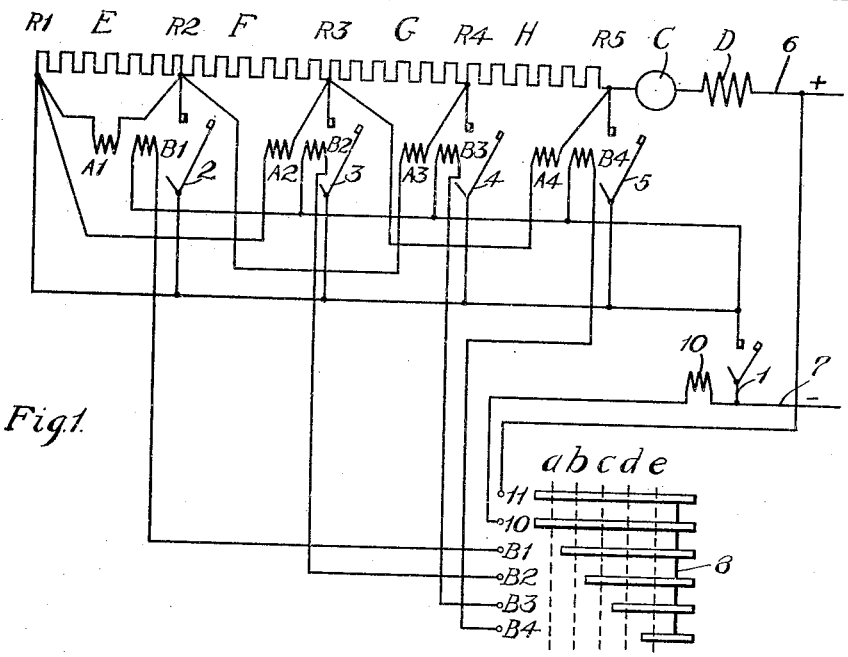
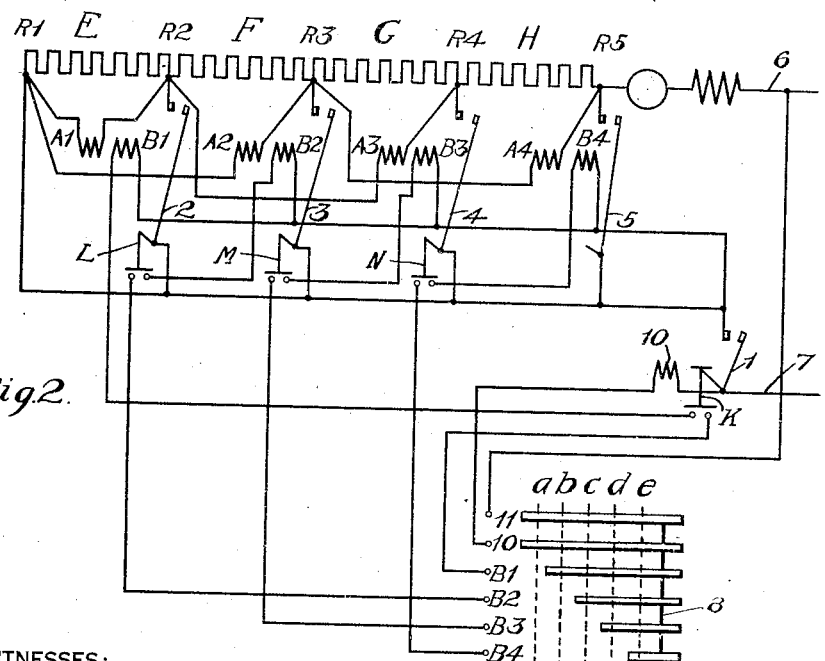

UNITED STATES PATENT OFFICE.

WILFRID BROOKE, OF ALTRINCHAM, ENGLAND, ASSIGNOR TO WESTINGHOUSE ELECTRIC AND MANUFACTURING COMPANY, A CORPORATION OF PENNSYLVANIA.

APPARATUS FOR THE CONTROL OF DYNAMO-ELECTRIC MACHINES.

1,363,638.  Specification of Letters Patent.  Patented Dec. 28, 1920.

Application filed May 18, 1918. Serial No. 235,313.

*To all whom it may concern:*

Be it known that I, WILFRID BROOKE, a subject of the King of Great Britain, and a resident of Altrincham, in the county of Chester, England, have invented a new and useful Improvement in Apparatus for the Control of Dynamo-Electric Machines, of which the following is a specification.

This invention relates to apparatus for the control of dynamo-electric machines, especially electric motors in which independently actuated switches or contactors are employed to effect the desired circuit connections and changes, variations in the amount of resistance in circuit, and so forth.

In control apparatus of this kind two types of independently actuated switches or contactors are commonly employed. One type is known as the "lock-out" or series contactor, one form of which is described in the specification of Letters Patent No. 20534 of 1911. The other type is a shunt contactor in conjunction with which mechanically or electrically interlocked current limiting accelerating relays are employed.

With control apparatus in which either of the above mentioned types of contactor is used automatic acceleration of the machine to be controlled may be effected, the several contactors employed being caused to close automatically in succession, the closure of successive contactors being dependent upon the amount of current taken by the machine.

As contactors of the first mentioned type have series actuating coils only, manual control of the apparatus for the purpose of arresting the successive automatic closing or opening of the contactors at predetermined points can only be effected by intercepting the main circuit and effecting changes in circuits carrying large currents on a manually operated master controller, which it is the object of the contactor type of control gear to avoid. Control apparatus having contactors of this type is therefore only used where it is not desired to stop at intermediate positions between zero and full speed.

Where manual control of the automatic successive actuation of the switches is required, as for example in the case with rolling mills or crane motors, control apparatus having contactors of the second type mentioned has hitherto been usually employed in conjunction with some form of series accelerating relay or relays, the circuits of the shunt actuating coils of the contactors being opened or closed by a master controller whereby the automatic successive actuation of the contactors may be arrested at any intermediate position between zero and full speed.

The object of the present invention is to provide improved control apparatus in which contactors of the first mentioned or lock-out type may be employed and in which the successive automatic actuation of the contactors may begin and cease at any position between zero and full speed, as may be desired, by manipulation of the master controller without either interrupting the main circuit at the master controller or employing accelerating or auxiliary relays or contacts.

This is accomplished, according to the present invention, by providing the contactors with two coils, one of which (hereinafter termed the shunt coil) is connected in shunt across the mains and the other (hereinafter termed the series coil) is energized in such a manner, as for example by connecting it across a portion or portions of the resistance in the motor circuit that the current flowing therein will vary substantially in accordance with the current in the main circuit. For the shunt coil may be substituted any coil having shunt characteristics, as, for example, a coil connected across the motor armature. Preferably the first mentioned or shunt coil is located on the contactor in a position nearer to the main or closing air gap than the other or series coil.

The circuits either of the shunt coils or of the series coils on the contactors or of both of these coils are opened and closed by a master controller so that the successive automatic operation of the contactors may be controlled as desired.

A control apparatus having contactors provided with operating coils in accordance with this invention may be arranged in various ways, some of which are indicated by way of example in the accompanying drawings in which Figure 1 is a diagram of one form of motor control apparatus with contactors provided with actuating coils energized and governed by a manually operated controller in accordance with the invention, Figs. 2 and 3 being similar diagrams hereinafter explained respectively illustrating modifications which may be introduced in the apparatus indicated in Fig. 1.

Referring now to Fig. 1; 6, 7 are the supply mains, D the field, and C the armature of an electric motor the speed of which is regulated by a resistance divided into four steps E, F, G, H, at the points R1, R2, R3, R4 and R5. The contactor for closing the line circuit is indicated at 1 and is provided with a shunt connected operating coil 10, the circuit of which is closed by moving the master controller 8 to position $a$ which will establish a circuit from the positive main 6 through the two upper contacts of the controller and said coil 10 to the negative main 7.

Contactors of the now well known lock-out type indicated at 2, 3, 4, 5, are provided for cutting out the various portions E, F, G, H, of the resistance in circuit with the motor and are each provided with two operating coils respectively indicated at A1, B1, A2, B2, A3, B3, A4, B4. The series coil A1 of contactor 2 is connected between the points R1, R2, across the step E of the resistance. The series coil A2 of contactor 3 is connected between the points R1, R3 and therefore across the steps E and F of the resistance. The series coil A3 of contactor 4 is connected between the points R2 and R4 and consequently across the steps F, G of the resistance, the series coil A4 of contactor 5 being similarly connected across two steps G, H, of the resistance. The other operating coils B1, B2, B3 and B4 of the contactors are respectively adapted to be connected in shunt across the mains 6, 7 by manipulation of the master controller 8. For example, if the master controller is moved to the position $b$ a circuit will be established from the negative main 7 through the line contactor 1, coil B1 and stationary contacts B1 and 11 of the master controller 8, to the positive main 6. The shunt coils B2, B3, B4 of the succeeding contactors 3, 4 and 5 will be similarly respectively connected in shunt across the mains by movement of the master controller to its positions $c$, $d$ and $e$. The motor circuit having been closed through the line contactor 1 by moving the master controller to position $a$ the potential will be distributed along the resistances E, F, G and H. As the motor increases in speed the potentials across the resistance steps E, F, G and H will decrease, as will also the potentials across the coils A1, A2, A3 and A4 which, as above described, are shunted across certain of the resistance steps.

Assuming now that the master controller 8 has been moved to position $b$, and the coil B1 of contactor 2 consequently connected in shunt across the mains, contactor 2 will be energized with the closing force due to the coil B1, said coil being situated adjacent to the main or closing air gap of the contactor. Coil A1 of contactor 2 which is situated remote from the main air gap of this contactor will already be energized in accordance with the potential across the step E of the resistance across which it is connected, this potential, as will be readily understood, being greatest immediately the circuit through the motor has been closed by the line contactor 1. The shunt and series coils on the contactors 2, 3, 4 and 5 are arranged to act cumulatively and so long as the current in the coil A1 of the contactor 2 exceeds a predetermined limit the combined action of the coils A1 and B1 will hold the contactor open. When the current in the resistance step E has decreased to the predetermined value represented by the adjustment of the holding or lock-out air gap of the contactor the action of the coils A1 and B1 will close the contactor in accordance with the well known action of contactors of the "lock-out" type. The closure of contactor 2 will cut off the current from the operating coil A1 but the current flowing in the shunt coil B1 will maintain this contactor closed so long as the master controller 8 is in its position $b$ or any of its subsequent positions $c$, $d$ and $e$.

Immediately on the closure of contactor 2, which short circuits section E of the resistance, the current in the resistance step F will be increased as will also the current in the resistance divisions G and H. The closure of contactor 3 will then take place under similar conditions to those described with reference to contactor 2 because the series coil A2 will prevent the closing of contactor 3 notwithstanding that the shunt coil B2 may have been energized by moving the master controller to positions $c$, $d$ or $e$ until the motor current passing through the resistance step F has fallen to the predetermined value, whereupon the contactor 3 will be closed by the combined effect of the coils A2 and B2.

The potentials across the resistance steps F, G and H will be proportional to the currents passing through them and the coils A2, A3 and A4 will consequently be substantially equivalent to series coils, the current flowing through them being proportional to the value of the current flowing in the main motor circuit in accordance with which the operation of the contactors 3, 4 and 5 is to be governed.

If the master controller 8 is moved in the first instance to an intermediate position such as the position $c$ or $d$, or to its final position $e$, the contactors 2, 3, 4 and 5 will be prevented from closing except in the proper sequence and in accordance with the current flowing through the motor circuit by what may be termed the staggered connection of the series coils A1, A2, A3, A4, of the contactors across the steps E, F, G and H of the resistance. As hereinabove described, all of these coils with the exception of coil A1 are connected across two successive steps of the resistance whereas coil A1 is connected across one step E only, hence the potentials on the coils A2, A3, etc., will not fall to their predetermined values unless closure of the contactors takes place in the proper sequence. The potential across the coil A1 will fall to the predetermined value before a similar fall takes place across the coils A2, A3, etc., because, as stated above, coil A1 is connected across one step only of the resistance. Assuming therefore that contactor 2 has been closed, the resistance step E together with coil A1 will be short circuited by the contactor 2, hence the coil A2 of contactor 3 becomes connected across only one step, F, of the resistance instead of being connected across two steps E and F. Contactor 3 will therefore be closed if the master controller 8 is in position c, d or e when the potential in its coil A2 has fallen to the predetermined value. As soon as the contactor 3 has closed and short circuited coil A2 and step F of the resistance it will be readily seen that coil A3 of contactor 4 will then become connected across only one step G of the resistance instead of the two steps F and G since the step F of the resistance has been short circuited by the closure of contactor 3. This operation will take place with the remaining contactors in a similar manner and closure of the contactors in the proper sequence will be insured and the maximum potential across the coils A2, A3, etc., will be held at a safe value under all conditions.

The control apparatus may also be operated in a reverse sense to reinsert resistance into the motor circuit. Assuming for example that the master controller has been moved to position e, and all the contactors have been closed and it is desired to reinsert the resistance steps G and H, the master controller will be returned to position c, whereupon the circuits of the shunt coils B4 and B3 of the contactors 5 and 4 will be opened on the master controller. Open circuiting the coil B4 will cause contactor 5 to open since the coil A4 was short-circuited by the contactor 5 when the latter was closed, but since contactor 5 was dependent on the coil B4 for remaining in its closed position opening the circuit of the latter will cause this contactor to open. This will result in resistance step H being reinserted into the motor circuit and coil A4 will no longer be short circuited. This, however, will not cause the contactor 5 again to close since the current in the coil A4 will be reduced by the insertion of step H in the resistance. Contactor 4 will be opened in a similar way by the deënergization of its shunt coil B3 due to the circuit of this coil being opened on the master controller, the latter being in position c.

If it is again desired to short circuit steps G and H of the resistance the master controller 8 will be moved to its final position e, whereupon the shunt coils B3 and B4 will both be energized but the corresponding contactors 4 and 5 will not be closed until the main motor current and consequently the potentials in the coils A3 and A4 have decreased to the predetermined values in the manner already described.

Although the manner described above, in which the series coils A1, A2, etc., of the contactors are connected across certain of the steps of the resistance, is a convenient one which may be adopted the invention is not limited to this method of connection for these coils and has been described by way of example only.

Additional safeguards to insure actuation of the several contactors in the proper sequence may, if desired, be employed. For example, as shown in Fig. 2, electrical interlock switches K, L, M, N may be provided in the circuits of the shunt operating coils B1, B2, etc., of the contactors, said interlock switches being mechanically closed by the closing of the preceding contactors in a well known manner. Where these interlock switches are employed the staggered connection of the series operating coils on the contactors to the resistance steps need not necessarily be adopted, as said interlock switches control the sequence of operation of the contactors and if desired the series operating coils on the contactors may be included in the main motor circuit instead of being energized as shown in the drawings from the speed controlling resistance.

As an additional safeguard the master controller may be arranged to open and close the circuits of the series as well as of the shunt operating coils of the contactors. One manner in which this can be effected is illustrated by way of example in Fig. 3 and will be clear to any one skilled in the art from an inspection of this figure without detailed description thereof.

Various other modifications may be made in the control apparatus. For example, the shunt operating coils of the contactors instead of being connected in shunt across the mains may be energized from a separate source such for instance as a battery.

The windings of the series actuating coils on the several contactors will be arranged to correspond with the voltages across the resistance steps to which they are connected depending upon the amount of resistance in each step. If, for example, the resistance steps are divided so as to be logarithmic proportions of the whole, the potentials across the steps will also be in logarithmic proportion. The series coils may be arranged to suit the different voltages by providing them with different windings, the range of adjustment of contactors of the lock-out type enabling them to be set to operate at any desired current value. Alternatively the series coils may all have similar windings and be adapted to the different potentials by connecting suitable resistances in series with them.

From the foregoing it will be seen that control apparatus may be provided having contactors of the lock-out type and manual control of the apparatus obtained, the automatic acceleration of the motor being governed by the current flowing through said contactors so that the rate of acceleration cannot be increased beyond that for which the several contactors are adjusted to operate successively and the employment of separate accelerating relays or devices such as are commonly employed where manual control is desired dispensed with.

I claim as my invention:

1. Electric-motor-control apparatus comprising separately actuated contactors of the lock-out type provided with two operating coils, one of which is connected in shunt across the mains and the other of which is energized substantially in accordance with the current flowing in the motor circuit, a resistor controlled by said contactors, and manually controlled means for selectively closing or opening the shunt coils of the contactors, said other coils being connected across a portion of said resistor, and said means being adapted to selectively control the circuits of all of said coils.

2. Electric-motor-control apparatus comprising separately actuated contactors of the lock-out type provided with two operating coils, one of which is connected in shunt across the mains and the other of which is energized substantially in accordance with the current flowing in the motor circuit, and manually controlled means for selectively closing or opening the shunt coils of the contactors, each of said shunt coils being located nearer the closing air gap of the contactor than the other coil.

3. Electric-motor-control apparatus comprising separately actuated contactors of the lock-out type provided with two operating coils, one of which is connected in shunt across the mains and the other of which is energized substantially in accordance with the current flowing in the motor circuit, and manually controlled means for selectively closing or opening the shunt coils of the contactors, said other coils being connected across a portion of said resistor, and said means being adapted to selectively control the circuits of said shunt coils.

4. The combination with an electric motor, of means for controlling the motor comprising a starting resistor and a plurality of electromagnetic switches for controlling said resistor which hold open when the current traversing said motor is relatively high and which close when the current decreases to a lower value, each of said switches having an energizing coil connected between points of different potential of said resistor.

5. The combination with an electric motor having an armature, and a resistor in series therewith, of a plurality of successively operable switches for short-circuiting said resistor, each having a lockout coil controlled in accordance with the voltage of said resistor and a closing coil, and means for manually controlling the circuits of said closing coils.

6. The combination with an electric motor having a resistor associated therewith, of a switch for controlling said resistor having a lockout coil responsive to the voltage of said resistor and a closing coil having shunt characteristics.

7. The combination with an electric motor having a plurality of resistor sections associated therewith, of a plurality of switches for successively controlling said resistor sections, the first of said switches to operate having a controlling coil connected across the resistor section which it controls and another of said switches having a controlling coil connected across the resistor section which it controls and the resistor section that is controlled by the next preceding switch to operate.

In testimony whereof, I have hereunto subscribed my name this twelfth day of April, 1918.

WILFRID BROOKE.